(12) United States Patent
Nishida et al.

(10) Patent No.: US 6,652,104 B2
(45) Date of Patent: Nov. 25, 2003

(54) CORRECTION OF IMAGE DISTORTION

(75) Inventors: Kazuhiro Nishida, Matsumoto (JP); Akitaka Yajima, Tatsuno (JP); Takafumi Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/076,321

(22) Filed: Feb. 19, 2002

(65) Prior Publication Data

US 2002/0122161 A1 Sep. 5, 2002

(30) Foreign Application Priority Data

Mar. 1, 2001 (JP) ........................................ 2001-056313

(51) Int. Cl.[7] ........................ G03B 21/14; G03B 21/22; G03B 21/00
(52) U.S. Cl. ........................ 353/70; 353/119; 353/122; 353/69
(58) Field of Search ...................... 353/37, 50, 69, 353/70, 98, 99, 119, 30–33, 122

(56) References Cited

U.S. PATENT DOCUMENTS

| | | | | |
|---|---|---|---|---|
| 4,712,142 A | * | 12/1987 | Tomita et al. | 358/468 |
| 5,404,185 A | * | 4/1995 | Vogeley et al. | 353/122 |
| 5,548,327 A | * | 8/1996 | Gunday et al. | 348/97 |
| 5,584,552 A | * | 12/1996 | Nam-Su et al. | 353/70 |
| 6,000,805 A | * | 12/1999 | Inagaki | 359/871 |
| 6,231,191 B1 | * | 5/2001 | Shiraishi et al. | 353/61 |
| 6,247,815 B1 | * | 6/2001 | Inova | 353/30 |
| 6,431,711 B1 | * | 8/2002 | Pinhanez | 353/69 |
| 2002/0021418 A1 | * | 2/2002 | Raskar | 353/69 |

FOREIGN PATENT DOCUMENTS

| | | |
|---|---|---|
| JP | A 8-98119 | 4/1996 |
| JP | A 10-111533 | 4/1998 |
| JP | A 10-260473 | 9/1998 |
| JP | A 10-325954 | 12/1998 |

* cited by examiner

*Primary Examiner*—Russell Adams
*Assistant Examiner*—Andrew Sever
(74) *Attorney, Agent, or Firm*—Oliff & Berridge, PLC

(57) ABSTRACT

A technique for easily correcting distortion in an image displayed on a projection surface is provided. A projector comprises: a display image data generator for generating display image data representing a display image to be displayed on the projection surface by using source image data; an electro-optical device for emitting light that forms an image in response to the display image data; and a projection optical system for projecting light emitted by the electro-optical device. The projection optical system comprises a variable angle mirror for reflecting light emitted by the electro-optical device. The display image data generator comprises: an angle information sensing section for sensing angle information for the mirror; and an image data adjusting section for adjusting the source image data in response to the angle information so as to correct distortion of the display image displayed on the projection surface, to generate the display image data.

9 Claims, 10 Drawing Sheets

Fig.2(A-1)
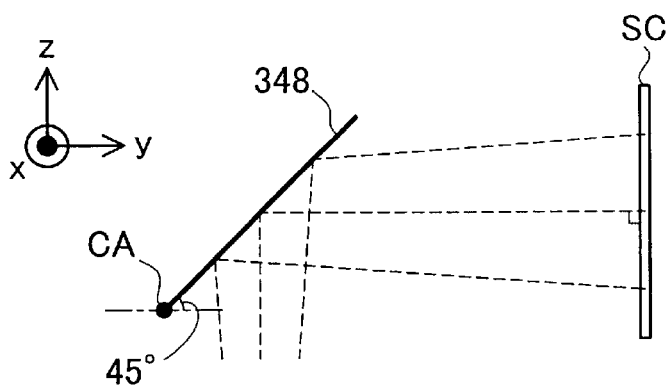
Fig.2(A-2)
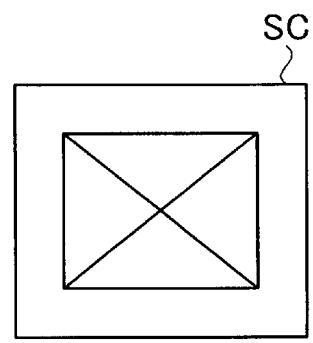
Fig.2(B-1)
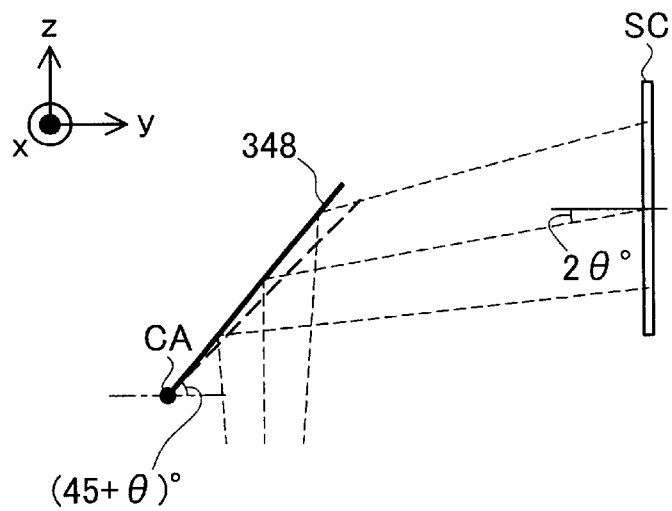
Fig.2(B-2)
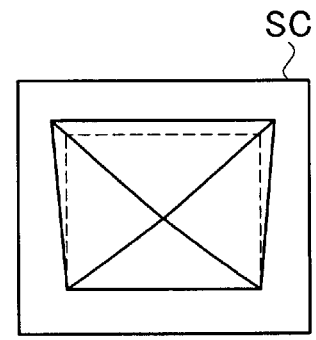

Fig.6(A-1)
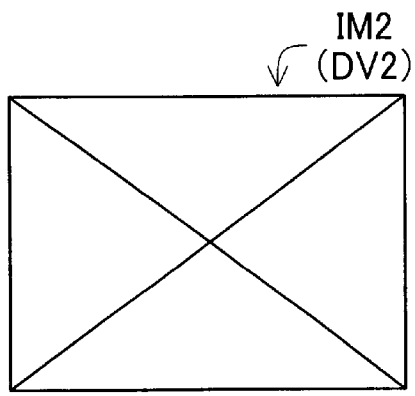
Fig.6(A-2)
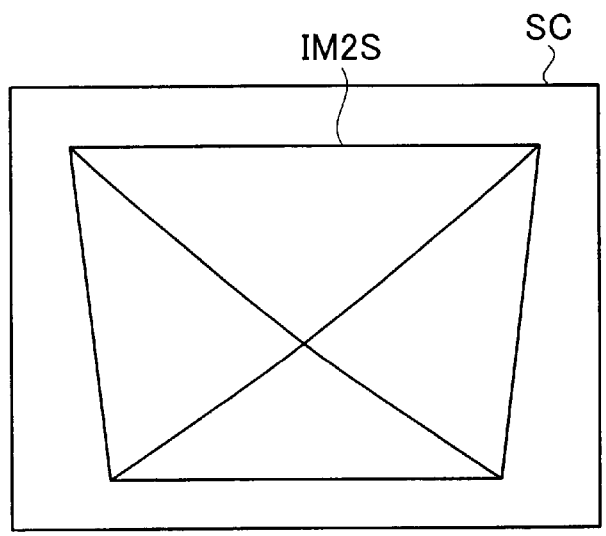
Fig.6(B-1)
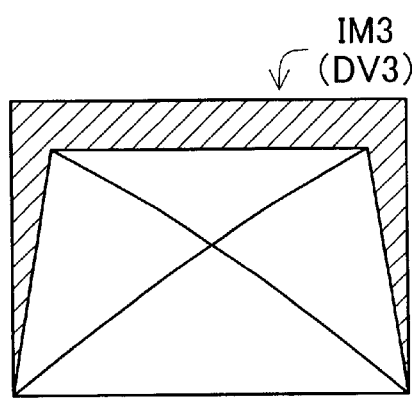
Fig.6(B-2)
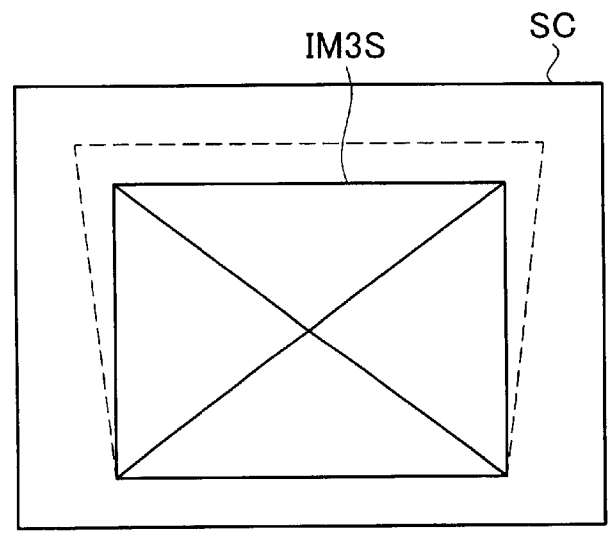

CORRECTION OF IMAGE DISTORTION

BACKGROUND OF THE INVENTION

1. Field of the Invention

The present invention relates to technique for correcting distortion in an image displayed on a projection screen by a projector.

2. Description of the Related Art

Projectors display images by modulating light from an illumination optical system in response to an image signal by means of a liquid crystal light valve, and projecting the modulated light onto a projection screen by means of a projection optical system.

When an image is projected and displayed onto the projection screen, if the center axis of the light representing the image (image light) emitted by the projector is not normal to the projection screen, the image on the projection screen experiences roughly trapezoidal distortion. Such distortion in a displayed image can be corrected by adjusting the image formed on the liquid crystal light valves.

However, to date it has been relatively difficult to correct distortion in an image displayed on a projection screen. This is because correcting distortion in a displayed image requires to know an angle between the center axis of the image light emitted by the projector and the normal of the projection screen, and knowing the correct angle is relatively difficult.

Specifically, the conventional process for adjusting the projection direction of a projector requires the user to manually adjust the height (extension) of the legs provided on the bottom of the projector. The angle of the center axis of the image light emitted by the projector with respect to the normal of the projection screen is determined according to the height of the legs. However, the process of adjusting the height of the projector legs is quite laborious.

SUMMARY OF THE INVENTION

In view of the drawbacks of the prior art described above, it is an object of the present invention to provide a technique for easily correcting distortion in an image displayed on a projection surface.

At least part of the above and the other related objects is attained by an apparatus which is a projector for displaying an image onto a projection surface. The projector comprises: a display image data generator for generating display image data representing a display image to be displayed on the projection surface by using source image data; an electro-optical device for emitting light that forms an image in response to the display image data; and a projection optical system for projecting light emitted by the electro-optical device. The projection optical system comprises a variable angle mirror for reflecting light emitted by the electro-optical device. The display image data generator comprises: an angle information sensing section for sensing angle information for the mirror; and an image data adjusting section for adjusting the source image data in response to the angle information so as to correct distortion of the display image displayed on the projection surface, to generate the display image data.

This projector comprises a variable angle mirror for reflecting light emitted by the electro-optical device, and an angle information sensing section for sensing angle information for the mirror, whereby it is a simple matter to determine the angle formed by the center axis of the image light emitted by the projector and the normal of the screen SC.

In the above apparatus, it is preferable that the mirror is rotatable about a predetermined center axis, and the angle information sensing section senses the angle information for the mirror centered on the predetermined center axis.

The angle information sensing section may comprise a rotary encoder, a moveable portion of the rotary encoder moving in association with rotation of the mirror.

By so doing, the angle information sensing section can readily sense angle information for the mirror. The rotary encoder may be of absolute type or incremental type.

Alternatively, the angle information sensing section may comprise a variable resistor, a moveable portion of the variable resistor moving in association with rotation of the mirror.

In this way as well the angle information sensing section can readily sense angle information for the mirror. The variable resistor may have three terminals (i.e. a potentiometer) or two terminals.

The above apparatus may further comprise a mirror controller for causing the mirror to rotate.

This obviates the need for the user to operate the mirror directly in order to adjust the angle thereof.

In the above apparatus, it is preferable that the display image data generator further comprises a distance information acquiring section for acquiring information about the distance between the projector and the projection surface; and the image data adjusting section generates the display image data according to the angle information and the distance information.

By so doing, distortion in a displayed image can be corrected precisely.

The distance information acquiring section may comprise a distance information sensing section for sensing the distance information.

By so doing, distance information can be determined easily.

In the above apparatus, the projection optical system may have a zoom function, and the distance information sensing section may sense the distance information using a zoom position of the projection optical system.

By so doing, information regarding the distance between the projector and the projection surface can be sensed precisely.

In the above apparatus, the mirror may be rotatable about two mutually orthogonal center axes, and the angle information sensing section may sense two sets of the angle information for the mirror centered on the two center axes.

While a displayed image can undergo roughly trapezoidal distortion in two directions, depending on the spatial relationship of the projector and the projection surface, image distortion occurring in two directions can be corrected by the above arrangement.

These and other objects, features, aspects, and advantages of the present invention will become more apparent from the following detailed description of the preferred embodiments with the accompanying drawings.

BRIEF DESCRIPTION OF THE DRAWINGS

FIGS. 2(A-1), 2(A-2), 2(B-1) and 2(B-2) are schematic representations of the relationship of the angle of mirror 348 to the image displayed on the screen SC;

FIGS. 6(A-1), 6(A-2), 6(B-1) and 6(B-2) are illustrative diagrams showing the process of the distortion correcting section 430 of FIG. 5;

DESCRIPTION OF THE PREFERRED EMBODIMENT

A. First Embodiment

A-1. Overall Structure of Projector

Figure 1A:
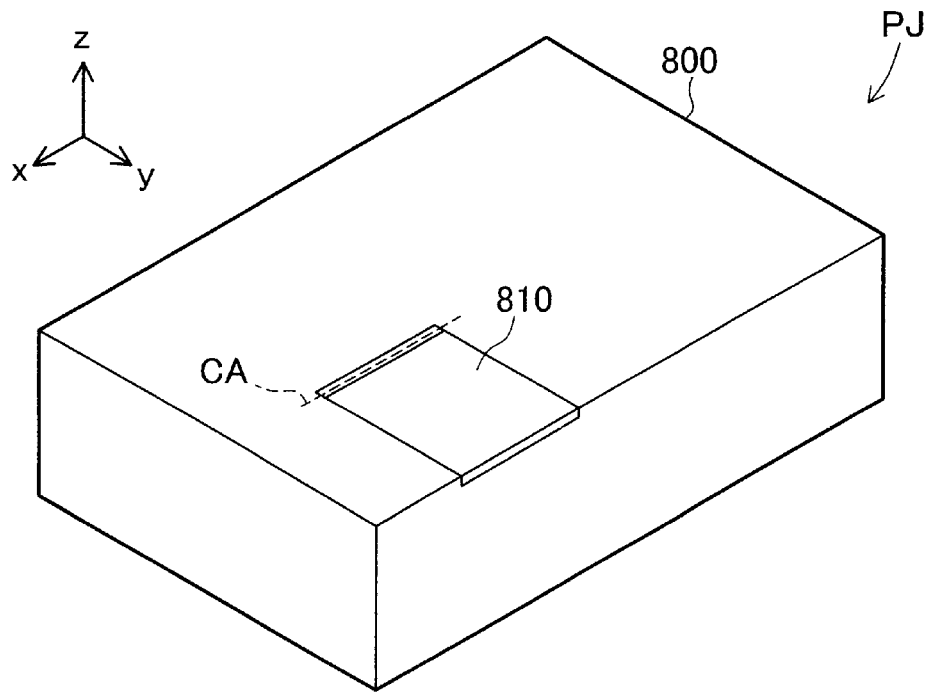
FIGS. 1(A) and 1(B) are illustrative diagrams showing the exterior of a projector PJ in accordance with first embodiment of the invention.
Figure 1B:
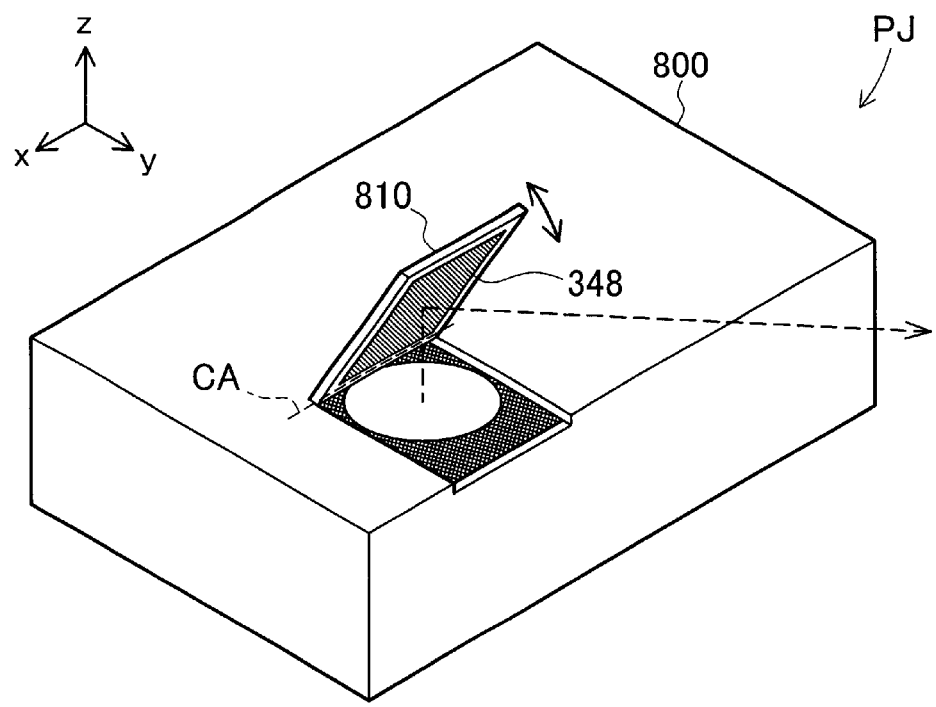

The embodiments of the invention are described hereinbelow. FIGS. 1(A) and 1(B) are illustrative diagrams showing the exterior of a projector PJ in accordance with first embodiment of the invention. Projector PJ comprises a housing 800 of substantially rectangular parallelopiped configuration, and a cover 810 of substantially rectangular configuration situated in an area of the top surface of housing 800. Cover 810 is attached to housing 800 by means of a shaft (not shown) and rotates about the center axis CA of the shaft. FIG. 1(A) shows the cover 810 in the closed position, and FIG. 1(B) shows the cover 810 in the open position.

Light representing an image (image light) generated within housing 800 is emitted to the outside via cover 810. Specifically, the inside face of cover 810 is provided with a mirror 348, and image light is directed out by being reflected off mirror 348. In other words, cover 810 functions as a mirror retaining mechanism for retaining mirror 348 in a variable angle manner, and with cover 810 in the open position depicted in FIG. 1(B), projector PJ is able to display an image on an area of the screen.

When the projector PJ is not displaying an image on the screen, cover 810 is in the closed position depicted in FIG. 1(A). Thus, the interior of the projector PJ is protected by the cover 810.

FIGS. 2(A-1), 2(A-2), 2(B-1) and 2(B-2) are schematic representations of the relationship of the angle of mirror 348 to the image displayed on the screen SC. FIG. 2(A-1) shows the angle of mirror 348 set to about 45° with respect to the normal of the screen SC. Here, the center axis of the image light emitted by the projector PJ is set substantially normal to the screen SC. FIG. 2(A-2) shows the image displayed on screen SC in the state depicted in FIG. 2(A-1). As shown in FIG. 2(A-2), the displayed image is free of distortion and has a rough rectangle shape.

FIG. 2(B-1) shows the angle of mirror 348 set to about $(45+\theta)°$ with respect to the normal of the screen SC. Here, the center axis of the image light emitted by the projector PJ is not normal to the screen SC, being offset by about $2\theta°$. FIG. 2(B-2) shows the image displayed on screen SC in the state depicted in FIG. 2(B-1). As shown in FIG. 2(B-2), the displayed image has trapezoidal distortion such that it bulges upward.

As depicted in FIGS. 2(B-1) and 2(B-2), if the center axis of the image light emitted by the projector PJ is not normal to the screen SC, in other words, if the projector PJ produces elevated projection of the image, the displayed image undergoes trapezoidal distortion. This results from the fact that the distance over which light emitted by the liquid crystal light valve within projector PJ travels to the screen SC is different for each point within the displayed image. Such image distortion (keystone distortion) can be corrected by adjusting the image light formed on the liquid crystal light valves of the projector, in other words, by adjusting the image data supplied to the liquid crystal light valves. By so doing it is possible to project an image free of distortion onto the screen SC.

A-2. Optical Structure of Projector

Figure 3:
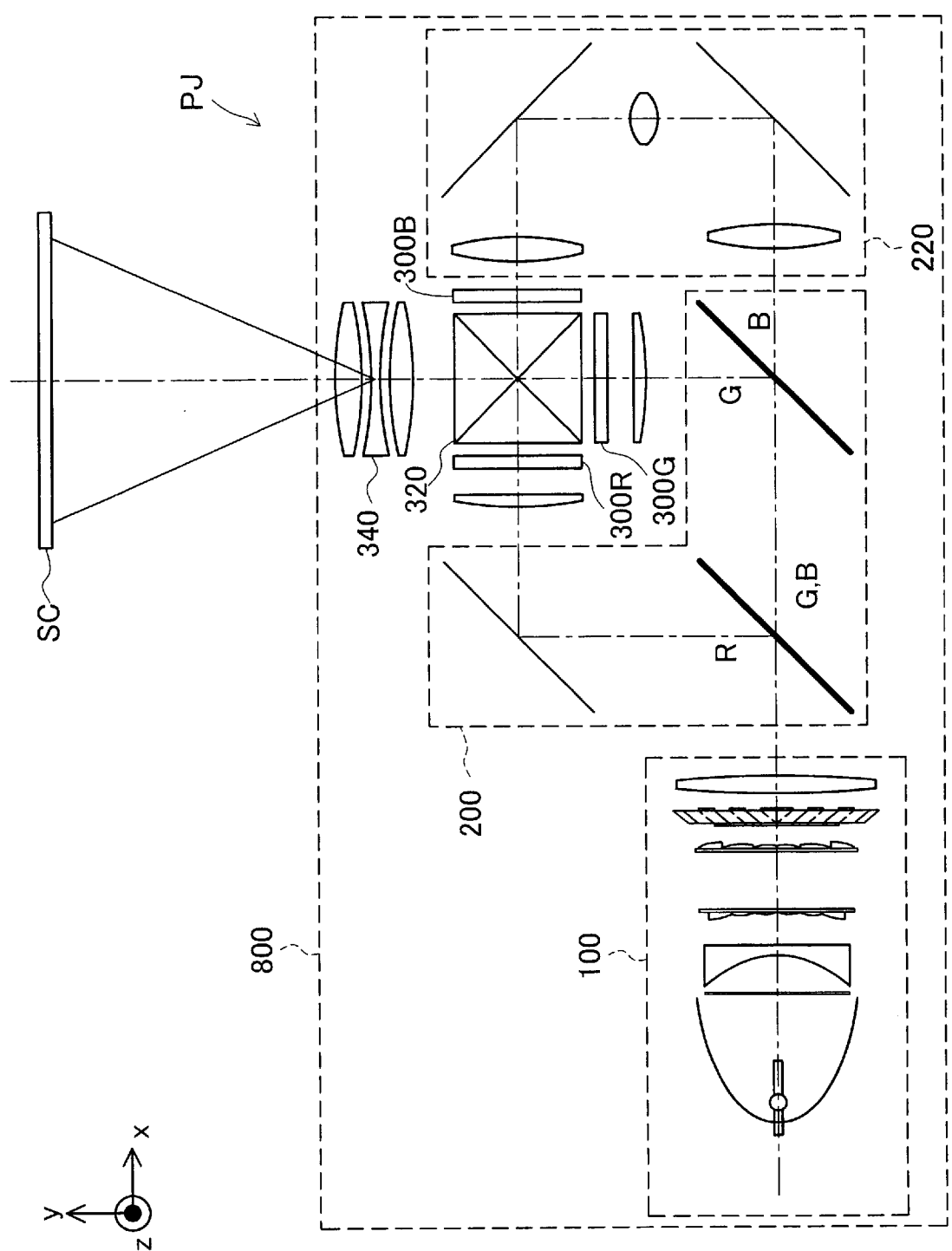
FIG. 3 is an illustrative diagram showing the optical structure of projector PJ.

FIG. 3 is an illustrative diagram showing the optical structure of projector PJ. Projector PJ comprises: an illumination optical system 100; a color light separation optical system 200; a relay optical system 220; three liquid crystal light valves 300R, 300G, 300B; a cross dichroic prism 320; and a projection optical system 340. Projection optical system 340 is simplified in the illustration of FIG. 3.

Light emitted by the illumination optical system 100 is separated by the color light separation optical system 200 into three color lights, red (R), green (G) and blue (B). The separated color lights are modulated by liquid crystal light valves 300R, 300G, 300B in response to image information. Each of the liquid crystal light valves 300R, 300G, 300B corresponds to the electro-optical device of the present invention, and each comprises a liquid crystal panel and polarizing plates situated at the incident light side and the exiting light side thereof. Modulated lights modulated by liquid crystal light valves 300R, 300G, 300B in response to image information are combined by the cross dichroic prism 320 and projected onto a screen SC by the projection optical system 340. This arrangement enables a color image to be displayed on the screen SC. The details of the structure and function of the respective components of the projector shown in FIG. 3 are described, for example, in Japanese Patent Laidopen Gazette No. H10-325954 disclosed by the present applicant and are thus not specifically explained here.

Figure 4:
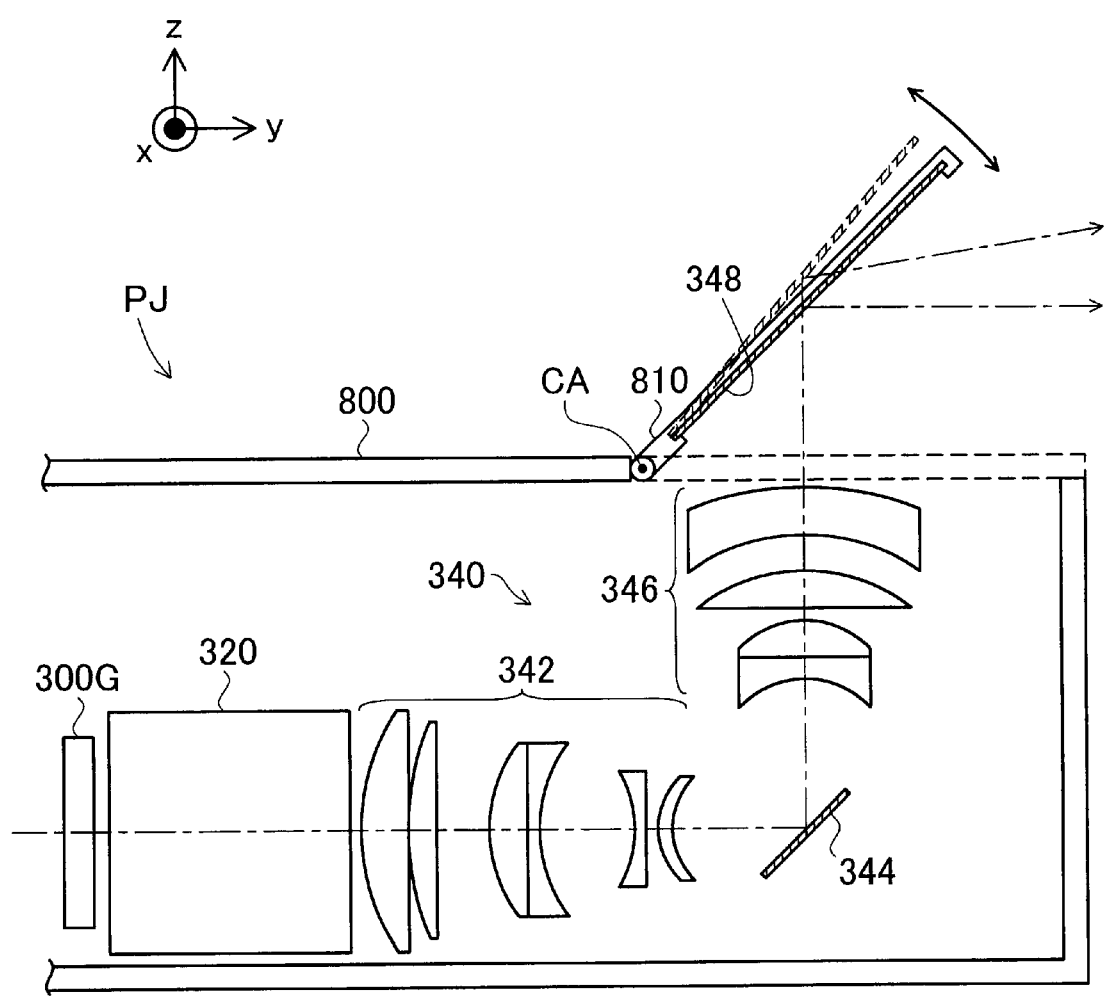
FIG. 4 is an illustrative diagram showing an enlarged view of the projection optical system 340 of FIG. 3.

FIG. 4 is an illustrative diagram showing an enlarged view of the projection optical system 340 of FIG. 3. With the projector in the state depicted in FIG. 1(B), the area around the cover 810 is depicted in FIG. 4 in simplified cross section taken in a plane parallel to the yz plane.

FIG. 4 depicts the liquid crystal light valve 300G, cross dichroic prism 320 and projection optical system 340 of FIG. 3 situated within housing 800. Image lights of each color produced by the respective liquid crystal light valves 300R, 300G, 300B are combined by the cross dichroic prism 320, and then the composite light enter the projection optical system 340.

Projection optical system 340 comprises: a first lens system 342, a first mirror 344, a second lens system 346, and a second mirror 348. Image light entering the projection optical system 340 passes through the first lens system 342 and is then reflected by the first mirror 344. The image light from the first mirror 344 then passes through the second lens system 346 and is reflected by the second mirror 348.

First mirror 344 is secured in place by means of a retaining section, not shown. The second mirror 348, on the other hand, is provided on the inside face of the cover 810 as described in FIG. 1(B), and thus the angle of the second mirror 348 about the axis CA can be varied by adjusting the degree of opening of the cover 810. In this way, the direction of travel of the reflected light can be altered by varying the angle of the second mirror 348. In other words, by varying the angle of the second mirror 348 image light can be directed onto a desired area of the screen SC.

In this embodiment, the size of the first mirror 344 is smaller than that of the second mirror 348. Since image light falling on the first mirror 344 is condensed by the first lens system 342, this gives the image light relatively small width.

A-3. Electrical Structure of Projector

Figure 5:
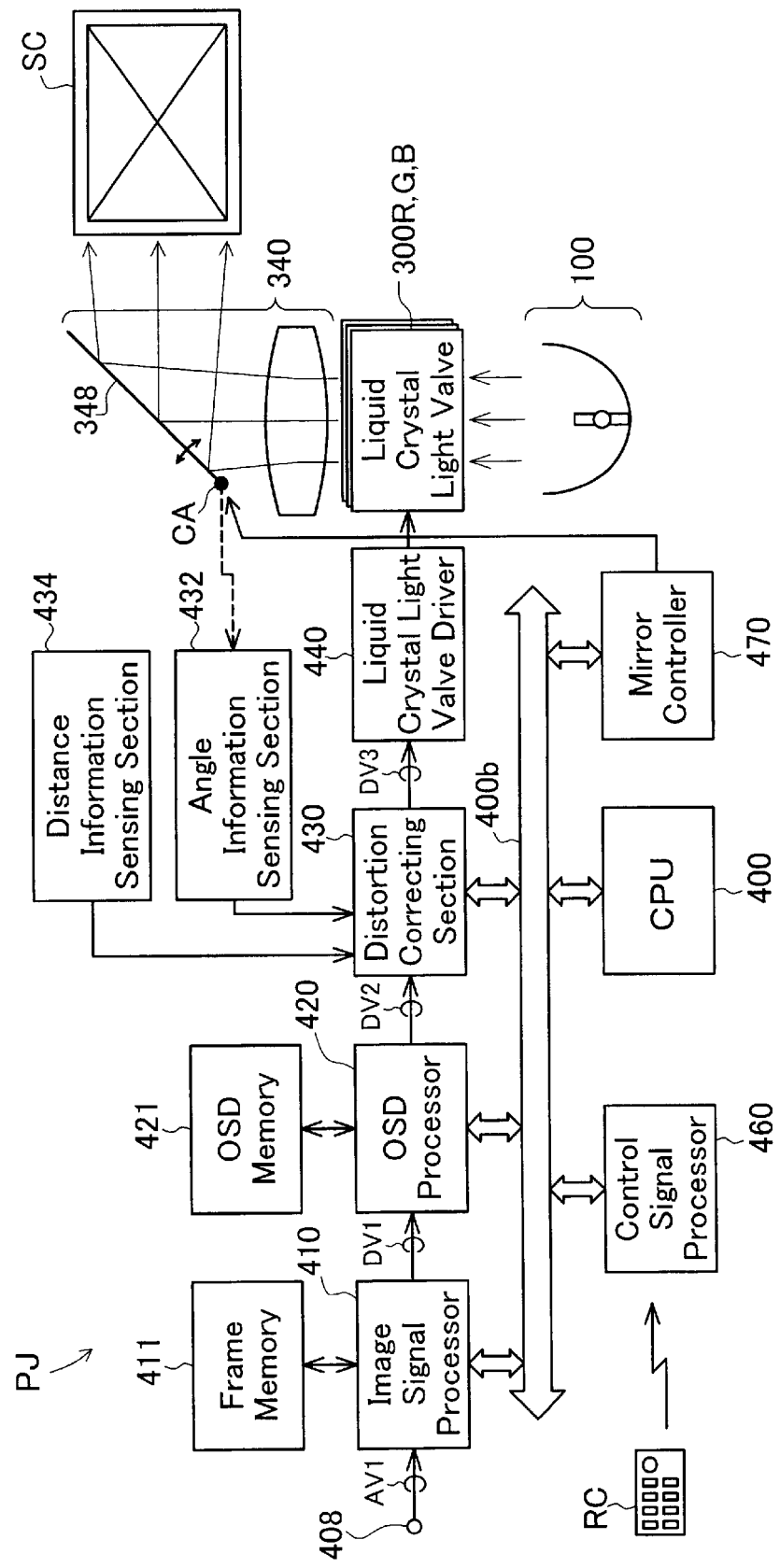
FIG. 5 is a block diagram showing the electrical structure of projector PJ.

FIG. 5 is a block diagram showing the electrical structure of projector PJ. Projector PJ comprises: a CPU 400; an image signal processor 410; a frame memory 411; an OSD (on-screen display) processor 420; an OSD memory 421; a distortion correcting section 430; an angle information sensing section 432; a distance information sensing section 434; a liquid crystal light valve driver 440; liquid crystal light valves 300R, 300G, 30DB; a control signal processor 460, and a mirror controller 470. CPU 400, image signal processor 410, OSD processor 420, distortion correcting section 430, control signal processor 460 and mirror controller 470 are interconnected via a bus 400b. The depiction of the optical system in FIG. 5 is considerably simplified.

An image input terminal 408 receives an analog image signal AV1 supplied by an external image signal supply device (not shown). The analog image signal AV1 may consist of an RGB signal representing a computer image output from a personal computer, a composite video signal representing motion video output from a video recorder or television receiver, or other image signal.

The image signal processor 410 has the function of performing AD conversion of the analog image signal AV1 and writing the converted image data to the frame memory 411; and of reading image data from the frame memory 411. The image signal processor 410 outputs image data DV1 for supply to the OSD processor 420.

The OSD processor 420, under an instruction from the control signal processor 460, performs a process for combining the image data DV1 with OSD image data representing menu images, etc. Specifically, the OSD processor 420 reads out menu image data from the OSD memory 421, generates OSD image data and combines this OSD image data with the image data DV1. Where the OSD processor 420 does not combine OSD image data with the image data DV1, the image data DV2 output by the OSD processor 420 is identical to the image data DV1 output by the image signal processor 410. Users can control the functions of the various components of the projector by following menu images.

Distortion correcting section 430 adjusts the image data DV2 output by the OSD processor 420 to generate adjusted image data DV3. Specifically, distortion correcting section 430 refers to angle information and distance information provided by the angle information sensing section 432 and the distance information sensing section 434 to generate adjusted image data DV3. Distortion in an image displayed on screen SC can be corrected by using the adjusted image data DV3. The processes performed by the distortion correcting section 430 will be discussed hereinbelow.

The adjusted image data DV3 output from distortion correcting section 430 is supplied to the liquid crystal light valve driver 440. The liquid crystal light valve driver 440 drives the liquid crystal light valves 300R, 300G, 300B in response to this image data DV3. The liquid crystal light valves 300R, 300G, 300B modulate the light emitted from the illumination optical system 100. The image lights emitted from the liquid crystal light valves 300R, 300G, 300B are projected onto the screen SC by the projection optical system 340, which includes the second mirror 348.

The control signal processor 460 controls the functions of the components of the projector on the basis of control signals given from a remote controller RC. For example, control signal processor 460 controls the OSD processor on the basis of control signals given from remote controller RC to display a menu image on the screen SC.

The mirror controller 470, under an instruction from the control signal processor 460, rotates the second mirror 348 of the projection optical system 340 about the axis CA. Specifically, by user's operation of the remote controller RC, the OSD processor 420 is caused to display a menu image for rotating the mirror 348. When the user operates the remote controller RC in accordance with the menu image, the mirror controller 470 rotates the second mirror 348 about the axis CA, under an instruction from the control signal processor 460. Alternatively, the second mirror 348 may be rotated through operation of control buttons (not shown) provided on the projector body, rather than by the remote controller RC.

It should be noted that the CPU 400, image signal processor 410, frame memory 411, OSD processor 420, OSD memory 421, distortion correcting section 430, angle information sensing section 432 and distance information sensing section 434 in this embodiment correspond to the "display image data generator" of the present invention. The distortion correcting section 430 corresponds to the "image data adjusting section", and image data DV2 and adjusted image data DV3 correspond respectively to the "source image data" and "display image data" herein.

A-4. Process of Distortion Correcting Section

FIGS. 6(A-1), 6(A-2), 6(B-1) and 6(B-2) are illustrative diagrams showing the process of the distortion correcting section 430 of FIG. 5. FIGS. 6(A-1), 6(A-2), 6(B-1) and 6(B-2) depict a process performed in the event that the center axis of the image light emitted from projector PJ is not normal to the screen SC, as depicted in FIG. 2(B-1).

FIG. 6(A-1) shows an image IM2 represented by image data DV2. Absent adjustment of the image data DV2 by the distortion correcting section 430, this image IM2 is produced by the each liquid crystal light valve 300R, 300G, 300B. As shown in FIG. 6(A-2), the image IM2S projected onto screen SC has a trapezoidal shape bulging at the top.

FIG. 6(B-1) shows an image IM3 represented by adjusted image data DV3. The adjusted image IM3 is composed of a trapezoidal image and a background image. The trapezoidal image has an inverse shape to that of FIG. 6(A-2), i.e., it has a trapezoidal shape bulging at the bottom. The background image is composed of black pixels. When this adjusted image IM3 is produced by the each liquid crystal light valve 300R, 300G, 300B, the roughly trapezoidal image IM3S depicting in FIG. 6(B-2) is displayed on the screen SC by the trapezoidal image within the adjusted image IM3.

In this way, the distortion correcting section 430 adjusts image data DV2 to generate adjusted image data DV3 so as to correct distortion of the image displayed on the screen SC. Specifically, the distortion correcting section 430 generates adjusted image data DV3 having distortion that is the reverse of image distortion that can occur on the screen SC.

By the way, more precise correction of distortion of a displayed image requires an angle between the center axis of the image light emitted from projector PJ and the normal of the screen SC, and requires also an distance between the projector PJ and the screen SC (or, more accurately, the distance from the principal plane (principal point) of the lens systems 342, 346 to the screen SC). To this end, the distortion correcting section 430 of this embodiment (FIG. 5) adjusts image data DV2 to generate adjusted image data DV3 according to angle information and distance information supplied by the angle information sensing section 432 and distance information sensing section 434. Correction of image distortion using angle and distance is described, for example, in Japanese Patent Laid-open Gazette No. H 8-98119.

The distance information sensing section 434 comprises a distance sensor allowing it to sense the approximate distance from the projector PJ to the screen SC. The distance sensor may consist, for example, of an ultrasonic sensor for measuring distance, which is used, for example, in auto focus cameras.

The distance information sensing section 434 comprises also a position sensor for sensing the zoom position of the projection optical system 340. Specifically, the projection optical system 340 of this embodiment has a zoom function, so that by changing the position of at least one lens from among the plurality of lenses—in other words, by changing the zoom position (e.g. to wide angle or telephoto) of the projection optical system 340—the magnification of the image displayed on the screen SC can be changed. Changing the zoom position also changes the position of the principal plane of the projection optical system 340, so the distance from the principal plane of the projection optical system 340 to the screen SC changes as well. In this embodiment, the distance sensor is used to determine the approximate distance from the projector PJ to the screen SC, and the position sensor is used to correct the approximate distance determined by the distance sensor. By so doing, the distance information sensing section 434 can accurately sense projector PJ-to-screen SC distance information (or, distance information from the principal plane of the projection optical system 340 to the screen SC) using a zoom position.

Typically, the correction made by the position sensor is fairly small relative to the approximate distance determined by the distance sensor. Accordingly, the position sensor may be omitted.

The angle information sensing section 432 comprises an angle sensor allowing it to sense the angle formed by the center axis of the image light emitted from projector PJ and the normal of the screen SC. In actual practice, the angle information sensing section 432 in this embodiment senses angle information indicating the condition of the second mirror 348 with respect to the top face of the housing 800, for example.

Figure 7:
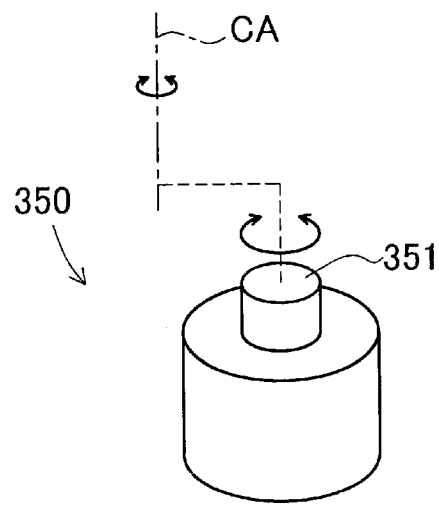
FIG. 7 is an illustrative diagram showing the exterior of the rotary encoder 350.

The angle information sensing section 432 of this embodiment comprises a rotary encoder as the angle sensor. FIG. 7 is an illustrative diagram showing the exterior of the rotary encoder 350. The rotary encoder 350 comprises a moveable portion 351 that rotates about the center axis thereof, and this moveable portion 351 is mechanically linked to the center axis CA (actually the shaft, not shown) of the second mirror 348 so that it moves in association with rotation of the second mirror 348. The moveable portion 351 may be linked directly to the center axis CA of the second mirror 348, or indirectly via a gear or the like.

Figure 8:
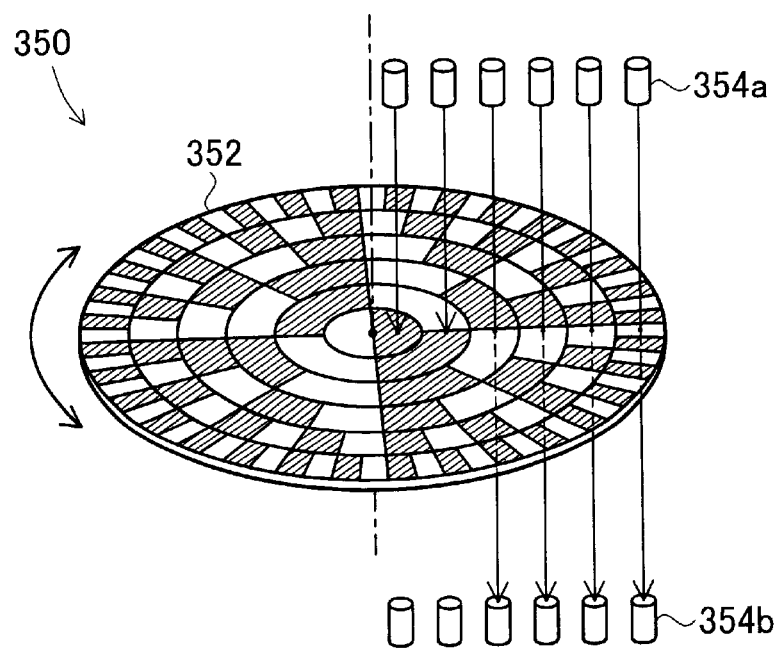
FIG. 8 is an illustrative diagram showing schematically the internal structure of the rotary encoder 350 of FIG. 7.

FIG. 8 is an illustrative diagram showing schematically the internal structure of the rotary encoder 350 of FIG. 7. The rotary encoder 350 comprises a rotating plate 352 and six sets each composed of a light emitting element 354a and a photo sensitive element 354b. The rotating plate 352 is a transparent disk divided into six concentric rings. Each ring is further divided into a plurality of smaller areas. Specifically, at the innermost ring it is divided into two smaller areas, and going towards the outermost ring is divided into smaller areas that progressively double in number. The plurality of smaller areas in each ring are assigned in alternating fashion as light blocking areas and light transmitting areas. Light blocking film, for example, is formed in the light blocking areas. The rotating plate 352 is mechanically linked to the moveable portion 351 of the rotary encoder 350, and moves in association with rotation of the second mirror 348. Accordingly, the six photo sensitive elements 354b can detect certain light/dark combinations associated with second mirror 348 angles. In FIG. 8, the two innermost photo sensitive elements 354b will detect a dark condition and the four outermost photo sensitive elements 354b will detect a light condition. In this way, by provision of the rotary encoder 350 the angle information sensing section 350 can sense angle information for the second mirror 348.

In FIG. 8 the angle information sensing section 432 can sense angle information at 6-bit resolution, but can be designed to sense angle information at higher resolution, by increasing the number of rings in the rotating plate 352 of the rotary encoder 350, and the numbers of sets of light emitting element 354a and photo sensitive element 354b.

In this embodiment, an absolute type rotary encoder capable of sensing the absolute angle of second mirror 348 is employed, but an incremental type rotary encoder could be used instead. An incremental type rotary encoder employs a rotating plate containing light blocking areas and light transmitting areas arrayed in a row along the circumference, and senses angle information by counting the number of light/dark pulses sensed by a photo sensitive element. The advantage of an incremental type rotary encoder is the ability to use a rotary encoder of relatively small size.

In general, the angle information sensing section 432 will comprise a rotary encoder, with the moveable portion of the rotary encoder moving in association with rotation of the second mirror 348.

Figure 9:
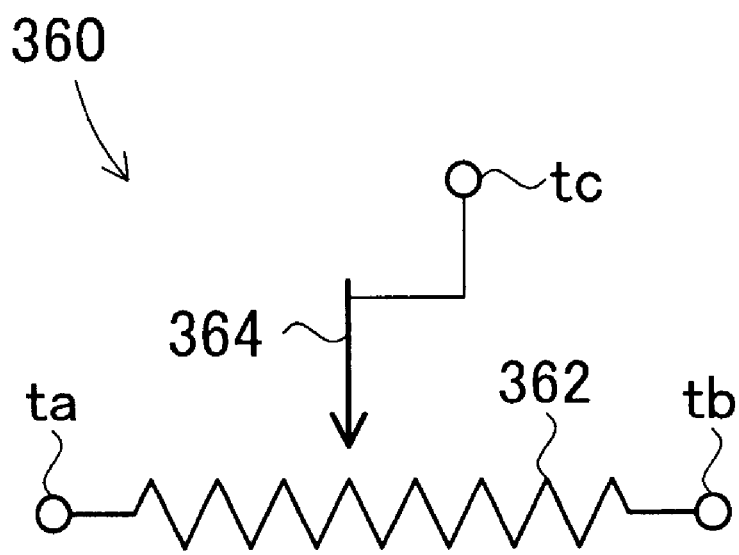
FIG. 9 is an illustrative diagram showing schematically the internal structure of a variable resistor 360.

As noted, in this embodiment the angle information sensing section 432 comprises a rotary encoder as the angle sensor; however, a variable resistor could be used instead. A variable resistor will have the same external appearance as in FIG. 7, and comprise a moveable portion. FIG. 9 is an illustrative diagram showing schematically the internal structure of a variable resistor 360. In actual practice, this variable resistor 360 is a rotary type variable resistor having three terminals ta, tb, tc. Two of the terminals ta, tb are connected to the two ends of a resistor 362, and the other one terminal tc is electrically connected to a slide portion 364 that slides along the resistor 362. By applying a constant voltage to the first and second terminals ta, tb, voltage corresponding to the position of the slide portion 364 can be obtained from the third terminal tc. The slide portion 364 is mechanically linked to the moveable portion of the variable resistor 360 and moves in association with rotation of the second mirror 348. Accordingly, voltage corresponding to second mirror 348 angles can be obtained from the third terminal tc. In this way the angle information sensing section 432 may sense angle information for second mirror 348 by providing it with a variable resistor 360.

In FIG. 9 the angle information sensing section 432 comprises a variable resistor having three terminals (also called a potentiometer), but a variable resistor having two terminals could be used instead.

In general, the angle information sensing section 432 will comprise a variable resistor, with the moveable portion of the variable resistor moving in association with rotation of the second mirror 348.

As noted, the angle information sensing section 432 comprises a rotary encoder or variable resistor whereby angle information for the second mirror 348 may be sensed readily.

In the projector PJ of this embodiment, the distortion correcting section 430 can accurately correct distortion in a displayed image using angle information and distance information supplied by an angle information sensing section 432 and a distance information sensing section 434, respectively. However, where the distance from the projector PJ to the screen SC is large relative to the dimensions of the image displayed on the screen SC, distortion in the displayed image can be corrected using angle information alone. By so doing the distance information sensing section 434 can be omitted.

As noted, the projector PJ of this embodiment comprises a variable angle mirror 348 for reflecting lights emitted by the liquid crystal light valves 300R, 300G, 300B; and an angle information sensing section 342 for sensing angle information for the mirror. Accordingly, the correct angle for the center axis of image light emitted by projector PJ relative to the normal of the screen SC can be readily determined, and as a result distortion in an image displayed on the screen SC can be readily corrected.

B. Second Embodiment

In the first embodiment there is described an arrangement in which the projector displays an image at a location offset in the vertical direction from the location directly in front thereof. However, in cases where, for example, a plurality of projectors are arrayed parallel to a screen to display the same image in a common area, it will be necessary to display images at locations offset in the horizontal direction from the location directly in front thereof. Or, in the event that a the projector displays an image at a location offset both in the vertical direction and the horizontal direction from the location directly in front thereof, the image displayed on the screen will have keystone distortion in the vertical direction as well as keystone distortion in the horizontal direction. This embodiment is designed to enable image distortion to be corrected in such cases as well.

Figure 10A:
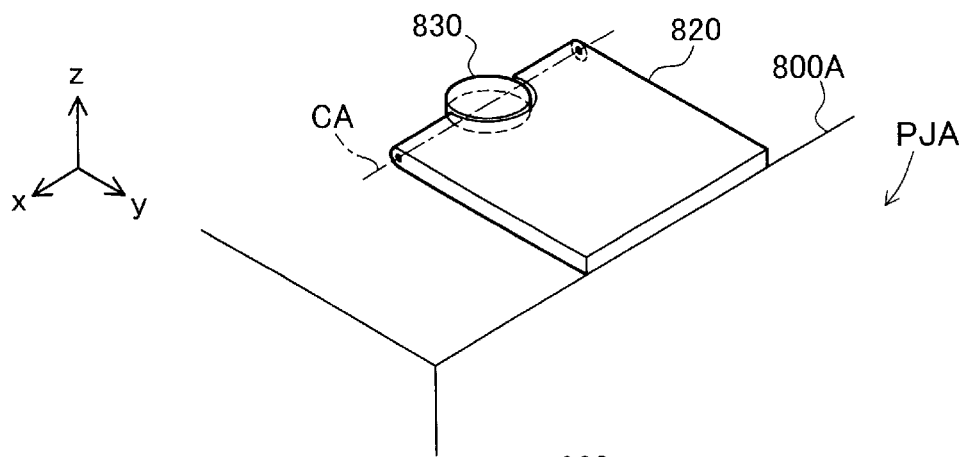
FIGS. 10(A), 10(B) and 10(C) are illustrative diagrams showing the exterior of a projector PJA of second embodiment.
Figure 10B:
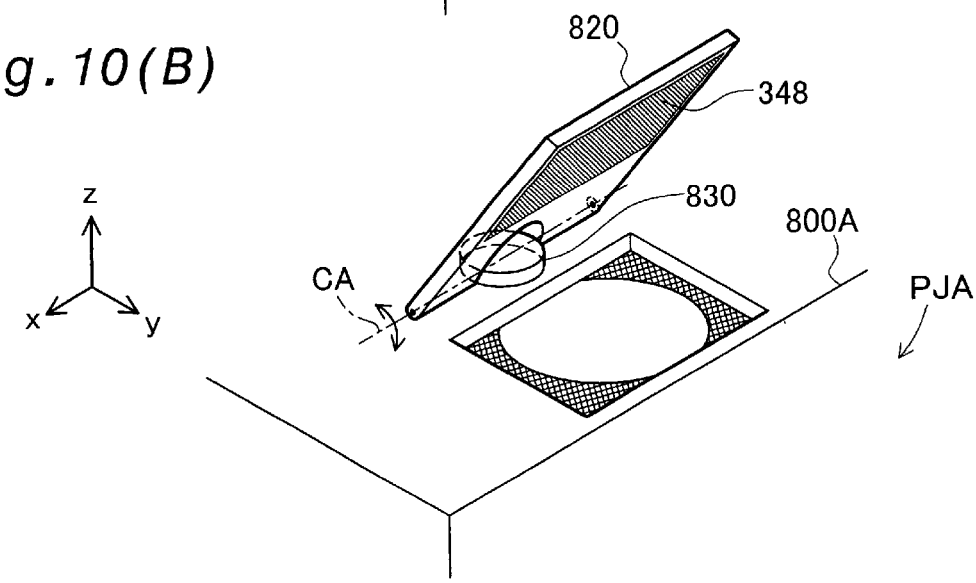
Figure 10C:
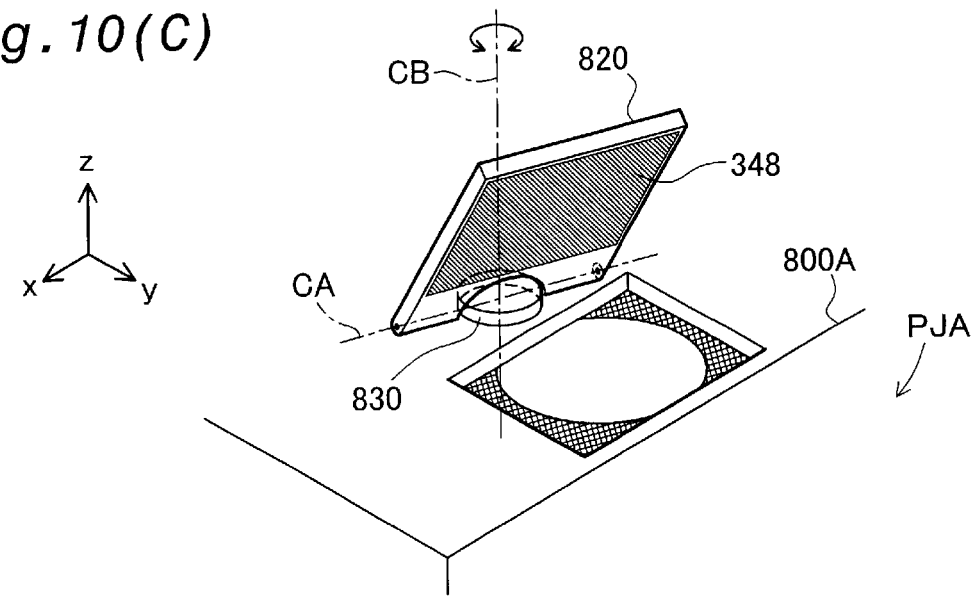

FIGS. 10(A), 10(B) and 10(C) are illustrative diagrams showing the exterior of a projector PJA of second embodiment. As in the first embodiment projector PJA comprises a housing 800A of substantially rectangular parallelopiped configuration, and a cover 820 of substantially rectangular configuration, having a mirror 348 on its inside face, situated in an area of the top surface of housing 800A.

FIG. 10(A) shows the cover 820 in the closed position, and FIGS. 10(B), (C) show the cover 820 in the open position. Specifically, FIG. 10(B) shows the cover 820 rotated about a first center axis CA. FIG. 10(C) shows the cover 820 rotated about a second center axis CB from the position shown in FIG. 10(B).

As shown in FIGS. 10(A) through 10(C), in this embodiment the cover 820 is rotatable about two mutually orthogonal center axes CA, CB. This is because the cover 820 is attached to a cylindrical column-shaped rotating member 830 provided on the top face of housing 800A. Specifically, rotating member 830 is attached to housing 800A in such a way that it can rotate about its center axis CB. Cover 820 is then attached to rotating element 830 such that it can rotate about the center axis CA of a shaft (not shown) that passes through the side wall of rotating member 830. By so doing the second mirror 348 provided to the inside face of cover 820 can rotate about the two mutually orthogonal center axes CA, CB.

As the second mirror 348 is retained by means of these mirror retaining mechanisms 820, 830, the projector PJA is able to display images at locations offset in both the vertical direction and horizontal direction relative to the location directly in front thereof.

Figure 11:
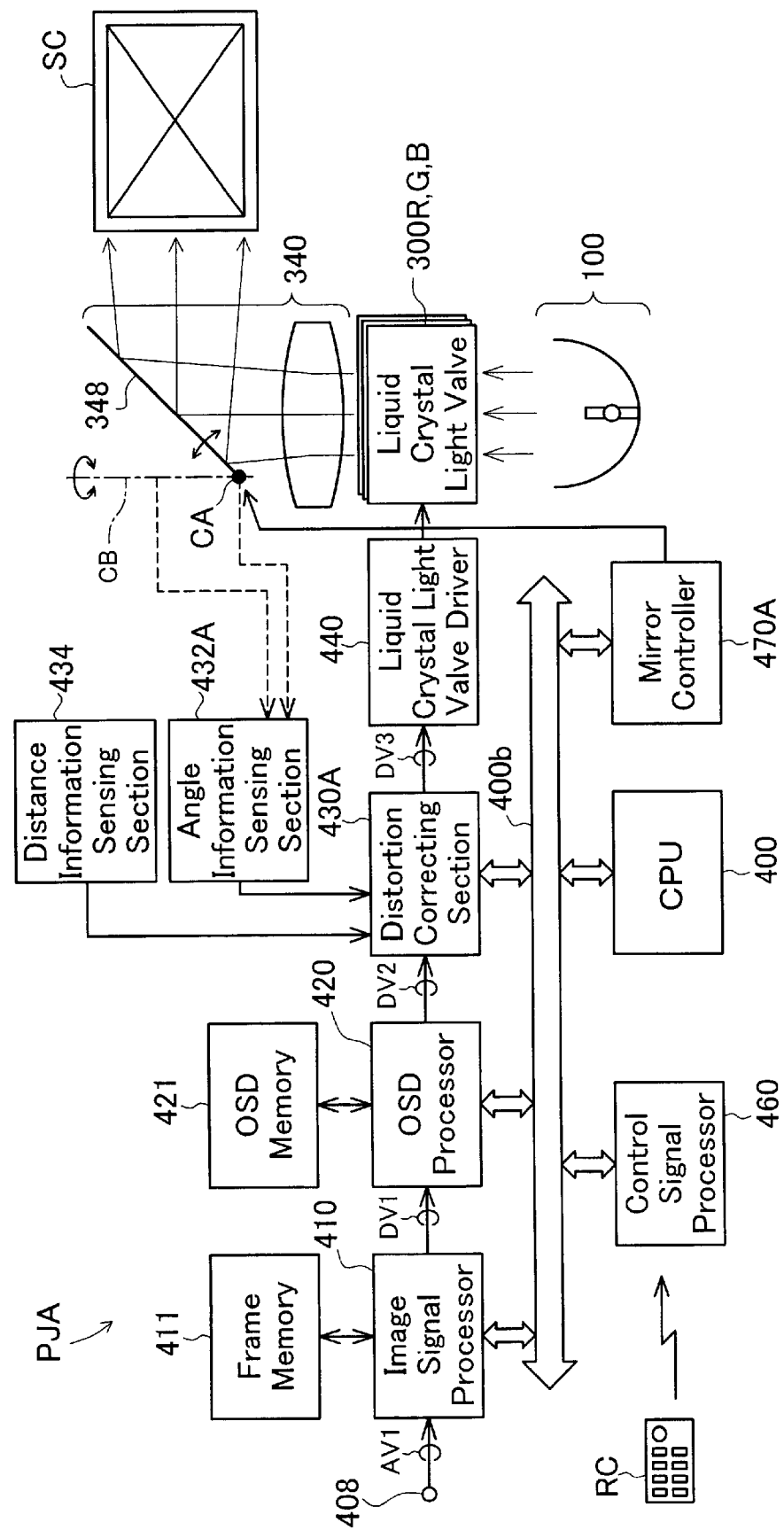
FIG. 11 is a block diagram showing the electrical structure of the projector PJA of FIGS. 10(A)–10(C).

FIG. 11 is a block diagram showing the electrical structure of the projector PJA of FIGS. 10(A)–10(C). The structure shown in FIGS. 10(A)–10(C) is substantially the same as that of FIG. 5, but in this embodiment the distortion correcting section 430A, angle information sensing section 432A and mirror controller 470A are modified.

The mirror controller 470A of this embodiment, under an instruction from the control signal processor 460, rotates the second mirror 348 about the two center axes CA, CB. The angle information sensing section 432A senses two sets of angle information for the second mirror 348 about the two center axes CA, CB thereof Specifically, the angle information sensing section 432A comprises two angle sensors (e.g. rotary encoders or variable resistors) for sensing angle information for the second mirror 348. The distortion correcting section 430A uses the two sets of angle information supplied by the angle information sensing section 432A to generate adjusted image data DV3.

As noted, in the projector PJA of this embodiment the second mirror 348 can rotate about two mutually orthogonal center axes CA, CB, and the angle information sensing section 432A senses two sets of angle information for the second mirror 348 about the two center axes CA, CB thereof. By so doing it is possible to correct image distortion produced in the vertical and/or horizontal directions.

The invention is not limited to the examples and embodiments set forth hereinabove, various modifications thereof being possible without departing from the scope and spirit of the invention. Modifications such as the following are possible, for example.

(1) In the preceding embodiments, distortion in displayed images is corrected using angle information for the second mirror 348 exclusively, but where the projector has legs, it is preferable to use a combination of first angle information associated with leg height and second angle information for the second mirror 348 to correct distortion in displayed images.

(2) In the preceding embodiments, there is employed a rotary encoder 350 comprising a circular rotating plate 352 as shown in FIG. 8; however, the rotating plate 352 may be fan-shaped. That is, since the second mirror 348 rotates about axis CA only within a certain range of angles during use of the projector, the rotating plate 352 may be of fan configuration that includes only this particular range of angles.

(3) In the preceding embodiments, the angle information sensing sections 432, 432A comprise rotary encoders or variable resistors, but other types of angle sensor could be provided. For example, there could be provided an angle sensor that is a combination of gears and magnetic proximity switches. In this case the gears will be arranged so as to move in association with the center axes CA, CB of the second mirror 348, and the magnetic proximity switches will be situated along the outside perimeter of the gears. By counting the number of times that gear teeth come into proximity with the magnetic proximity switch, the angle information sensing section will be able to sense angle information for the second mirror 348.

Alternatively the angle information sensing section may comprise an angle sensor that is a combination of a rotating plate having a plurality of openings spaced at equal intervals along its circumference and a set of a light emitting element and a photo sensitive element. The photo sensitive element counts the number of light/dark pulses via the plurality of openings, enabling the angle information sensing section to sense angle information for the second mirror 348. This angle sensor is a rotary encoder in the broad sense.

Thus, in general, an angle information sensing section for sensing mirror angle information will be provided with a projector.

(4) In the preceding embodiments, the projectors PJ, PJA comprise mirror controllers 470, 470A, but the mirror controllers may be omitted. In such a case the second mirror 348 can be rotated about center axes CA, CB through direct operation of cover 810, 820 by the user. However, an advantage of employing mirror controllers 470, 470A is that the user need not directly operate the angle of the second mirror 348.

(5) In the preceding embodiments, the projectors PJ, PJA comprise a distance information sensing section 434 as the distance information acquiring section, but a distance information setting section could be used instead. In this case, the user, by operating the remote controller RC for example, instructs the OSD processor 420 to display a menu image for making distance information settings, and then sets the desired distance information settings to the distance information setting section by operating the remote controller RC. However, an advantage of employing a distance information sensing section 434 is that distance information can be determined readily.

Thus, in general, a distance information acquiring section for acquiring distance information will be provided with a projector.

(6) In the preceding embodiments, liquid crystal light valves 300R, 300G, 300B are used as the electro-optical device of the projector, but various other devices that emit light forming an image in response to supplied image data could be used as the electro-optical device. For example, a DMD (Digital Micromirror Device, trademark of TI Corp.) or other micromirror type light modulating device could be used, as could a high-luminance CRT or plasma display panel.

(7) In the preceding embodiments, the projection optical system 340 comprises two mirrors 344, 348 as shown in FIG. 4, but the first mirror 344 could be eliminated, instead arranging the two lens systems 342, 346 in-line.

In the preceding embodiments, the second mirror 348 situated in the final stage of the projection optical system 340 is the variable angle mirror, but the first mirror 334 could be the variable angle mirror.

In the preceding embodiments, the projection optical system 340 has only one variable angle mirror, but could be provided with two or more variable angle mirrors.

Thus, in general, at least one variable angle mirror for reflecting light emitted by the electro-optical device will be provided with a projector.

(8) In the preceding embodiments, some of the element implemented by means of hardware could instead be replaced with software, while conversely some of the element implemented by means of software could instead be replaced with hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projector for displaying an image onto a projection surface comprising:
   a display image data generator for generating display image data representing a display image to be displayed on the projection surface by using source image data;
   an electro-optical device for emitting light that forms an image in response to the display image data;
   a projection optical system for projecting light emitted by the electro-optical device; and
   a housing for containing the display image data generator, the electro-optical device and the prolection optical system, the housing having a cover,
   wherein the projection optical system comprises a variable angle mirror, formed in an inside face of the cover, for reflecting light emitted by the electro-optical device, and
   the display image data generator comprises:
      an angle information sensing section, for sensing angle information for the mirror; and
      an image data adjusting section for adjusting the source image data in response to the angle information so as to correct distortion of the display image displayed on the projection surface, to generate the display image data.

2. The projector according to claim 1, wherein
   the mirror is rotatable about a predetermined center axis, and
   the angle information sensing section senses the angle information for the mirror centered on the predetermined center axis.

3. The projector according to claim 2, wherein the angle information sensing section comprises a rotary encoder, a moveable portion of the rotary encoder moving in association with rotation of the mirror.

4. The projector according to claim 2, wherein the angle information sensing section comprises a variable resistor, a moveable portion of the variable resistor moving in association with rotation of the mirror.

5. The projector according to claim 2 further comprising a mirror controller for causing the mirror to rotate.

6. The projector according to claim 2, wherein
   the display image data generator further comprises a distance information acquiring section for acquiring information about the distance between the projector and the projection surface; and
   the image data adjusting section generates the display image data according to the angle information and the distance information.

7. The projector according to claim 6, wherein the distance information acquiring section comprises a distance information sensing section for sensing the distance information.

8. The projector according to claim 7, wherein
   the projection optical system has a zoom function, and
   the distance information sensing section senses the distance information using a zoom position of the projection optical system.

9. The projector according to claim 1, wherein
   the mirror is rotatable about two mutually orthogonal center axes, and
   the angle information sensing section senses two sets of the angle information for the mirror centered on the two center axes.

* * * * *